(12) United States Patent
Nakayama

(10) Patent No.: US 8,554,438 B2
(45) Date of Patent: Oct. 8, 2013

(54) VEHICULAR LANE DEPARTURE PREVENTION CONTROL APPARATUS

(75) Inventor: Daisuke Nakayama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 166 days.

(21) Appl. No.: 13/070,981

(22) Filed: Mar. 24, 2011

(65) Prior Publication Data
US 2011/0246040 A1 Oct. 6, 2011

(30) Foreign Application Priority Data

Mar. 30, 2010 (JP) ................................ 2010-079029

(51) Int. Cl.
*G06F 19/00* (2011.01)

(52) U.S. Cl.
USPC ........... 701/70; 188/106 F; 701/1; 303/115.4; 303/11

(58) Field of Classification Search
None
See application file for complete search history.

(56) References Cited

U.S. PATENT DOCUMENTS

| 2005/0096827 A1* | 5/2005 | Sadano et al. | 701/70 |
| 2011/0004385 A1* | 1/2011 | Ishimoto | 701/70 |

FOREIGN PATENT DOCUMENTS

| JP | 2003-112540 | 4/2003 |
| WO | WO/2009/107663 | * 9/2009 |

* cited by examiner

*Primary Examiner* — Thomas Tarcza
*Assistant Examiner* — Garrett Evans
(74) *Attorney, Agent, or Firm* — Smith, Gambrell and Russell, LLP

(57) ABSTRACT

A vehicular lane departure prevention control apparatus calculates first and second departure amounts based on lane line position information and obstacle position information, sets braking forces for lane departure prevention control based thereon, and outputs the braking forces to a brake control unit, the braking forces for generating a yaw moment and a deceleration to a subject vehicle and preventing the vehicle from departing with respect to the lane line and obstacle, while setting a departure level for target pump motor rotation speed setting based on a vehicle speed, a difference of the steering wheel angle from a crossing angle and the first departure amount, setting a target rotation speed for a pump motor of a hydraulic unit in a brake control unit based thereon, and then outputting the target rotation speed to the brake control unit so as to variably control the rotation speed of the pump motor.

12 Claims, 12 Drawing Sheets

VEHICULAR LANE DEPARTURE PREVENTION CONTROL APPARATUS

CROSS REFERENCES TO RELATED APPLICATIONS

The present application claims priority from Japanese Patent Application No. 2010-079029 filed on Mar. 30, 2010, the entire contents of which are hereby incorporated by reference.

BACKGROUND OF THE INVENTION

1. Field of the Invention

The present invention relates to a vehicular lane departure prevention control apparatus capable of preventing a departure toward a roadside obstacle and preventing a departure from a lane across a lane line by executing braking force control to generate a yaw moment and a deceleration.

2. Description of the Related Art

In recent years, various technologies of vehicular lane departure prevention control apparatuses for preventing a lane departure and improving safety have been proposed and have being practically applied. For example, Japanese Patent Application Laid-Open (JP-A) No. 2003-112540 (hereinafter, referred to as Patent Document 1) discloses a technology in which, based on an estimated departure amount from a traveling lane, a driving/braking force control amount for each wheel is calculated with a braking force difference in left and right wheels being limited to an upper limit value such that a yaw moment is generated in a lane-departure-avoidance direction, and, based on the estimated departure amount, a braking force control amount for each wheel is calculated such that the vehicle decelerates, thereby controlling a driving/braking force of each wheel.

According to the vehicular lane departure prevention control apparatus disclosed in Patent Document 1, when a yaw moment or a deceleration is generated by braking force control to prevent a vehicle from departing from a lane, a pump motor of a brake hydraulic unit in a brake system is fully driven to generate a large hydraulic pressure in advance and a valve adjusts the generated hydraulic pressure to a desired hydraulic pressure, so as to accept any lane departure amount. Accordingly, the life of the pump motor in the brake system is decreased, and vibration and noise become large.

SUMMARY OF THE INVENTION

The present invention is made in view of the above, and it is an object of the present invention to provide a vehicular lane departure prevention control apparatus capable of accepting any lane departure amount, and minimizing the operation of a pump motor to suppress the generation of operation noise and vibration and extend the life of the pump motor.

The present invention is a vehicular lane departure prevention control apparatus including: road information detecting means for detecting at least roadside obstacle information and lane line information; departure amount calculating means for calculating a departure amount with respect to an obstacle and a departure amount with respect to a lane line based on the roadside obstacle information and the lane line information; braking force control means for controlling braking means by calculating a braking force for generating a yaw moment and a deceleration to a vehicle so as to prevent the departure of the vehicle with respect to the obstacle based on the departure amount with respect to the obstacle and the departure of the vehicle with respect to the lane line based on the departure amount with respect to the lane line; and pump motor rotation speed control means for setting a target rotation speed of a pump motor of the braking means based on at least the departure amounts and variably controlling the rotation speed of the pump motor.

According to the vehicular lane departure prevention control apparatus of the present invention, any lane departure amount can be accepted and the operation of the pump motor can be minimized, thereby suppressing the generation of operation noise and vibration and extending the life of the pump motor.

DESCRIPTION OF THE PREFERRED EMBODIMENTS

Figure 1:
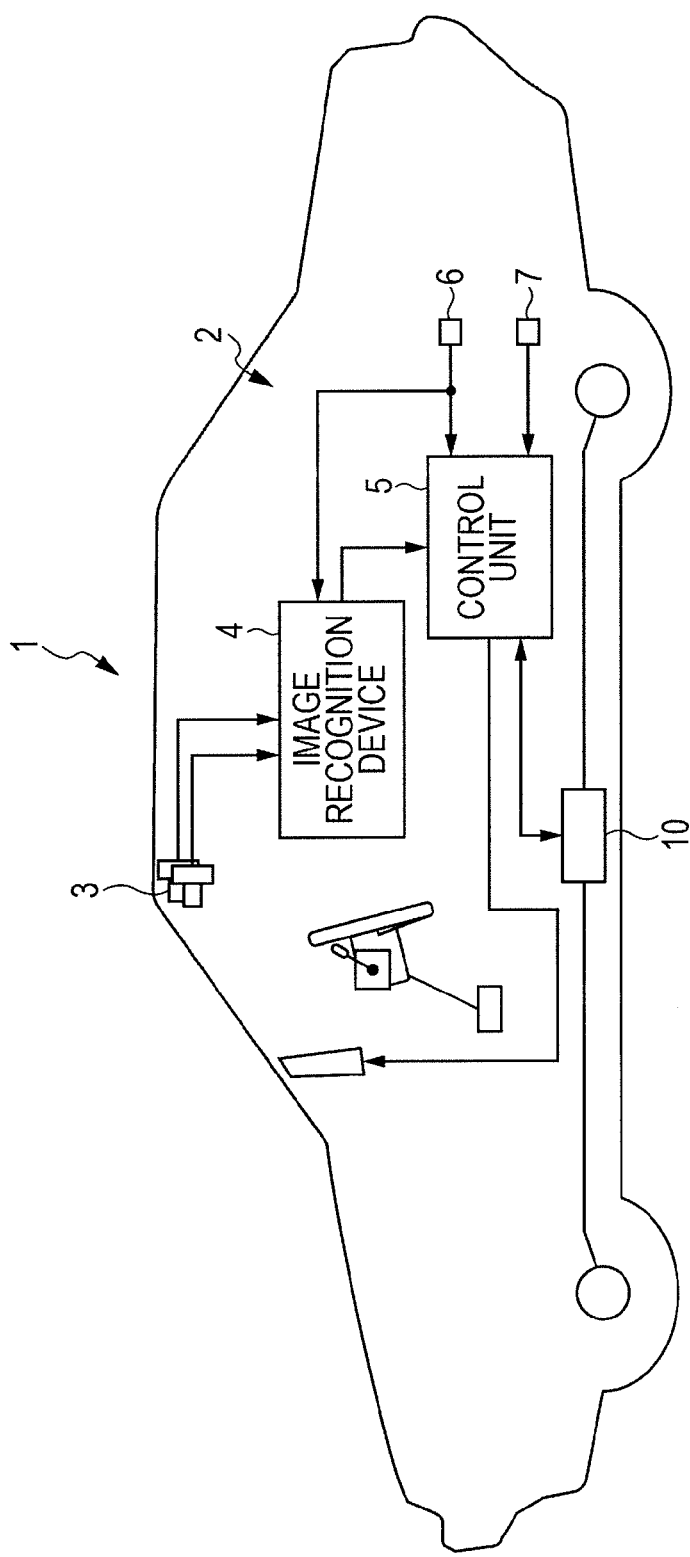
FIG. 1 is a schematic structural diagram of a vehicular lane departure prevention control apparatus according to an embodiment of the present invention, the apparatus being mounted on a vehicle.

An embodiment of the present invention will hereunder be described with reference to the drawings. In FIG. 1, numerical reference 1 denotes a vehicle (subject vehicle) such as an automobile and a vehicular lane departure prevention control apparatus 2 is mounted on the vehicle 1. The vehicular lane departure prevention control apparatus 2 is mainly configured with a stereo camera 3, an image recognition device 4, a control unit 5 and the like.

The subject vehicle 1 is also provided with a vehicle speed sensor 6 that detects a vehicle speed V0, and outputs the vehicle speed V0 to the control unit 5, a steering wheel angle sensor 7 that detects a steering wheel angle θH, and outputs the steering wheel angle θH to the control unit 5. The subject vehicle 1 is further provided with a hydraulic unit that includes a pump motor and a plurality of valves, and a brake control unit 10 that includes a controller for executing braking controls such as normal brake control, antilock brake control and side-slip prevention control and serves as the braking means. In addition to executing the above-mentioned controls, the controller of the brake control unit 10 receives from the control unit 5 control signals that are a target pump motor rotation speed Rp and wheel braking forces Bfi, Bfo, Bri and Bro for lane departure prevention control (wherein the suffixes "f" and "r" respectively denote a front wheel and a rear wheel, while the suffix "i" denotes a wheel at the side of the road center, and the suffix "o" denotes a wheel at the side of the roadside). The control unit of the brake control unit 10 performs yaw moment control and deceleration control by controlling the valves of the hydraulic unit such that a pump motor rotation is set to the target pump motor rotation speed Rp while the wheel braking forces Bfi, Bfo, Bri and Bro for lane departure prevention control are achieved.

The stereo camera 3 includes a pair of (left and right) CCD cameras, which use solid-state imaging devices such as charge coupled devices (CODs), as a stereo optical system. The left and right CCD cameras are attached to a front part of a ceiling in a vehicle interior at a fixed interval. The CCD cameras stereoscopically image an object outside the subject vehicle 1 from different viewpoints, and output image data to the stereo image recognition device 4.

Processing of the images from the stereo camera 3 in the stereo image recognition unit 4 is performed as described below, for example. First, to a pair of stereo images of an environment in a traveling direction of the subject vehicle 1 captured by the CCD cameras of the stereo camera 3, the stereo image recognition device 4 applies processing for obtaining distance information based on a deviation amount of corresponding positions, and generates a distance image representing a three-dimensional distance distribution.

Then, the stereo image recognition device 4 performs well-known grouping processing on the basis of the data, compares the data with three-dimensional road shape data, sidewall data, object data and the like which are stored in advance, and extracts lane line data and roadside obstacle data (three-dimensional data of a fixed obstacle such as side walls of a guard rail, curbstones, a utility pole and the like present along a road, a four-wheel vehicle, a two-wheel vehicle, a pedestrian and the like). To the lane line data and roadside obstacle data obtained as described above, different numbers are allocated according to the respective types of data.

The image recognition device 4 stores positions of the lane line and roadside obstacles on a predetermined two-dimensional coordinate having a center representing a predetermined camera position in the subject vehicle 1, and outputs the stored data to the control unit 5.

Figure 8:
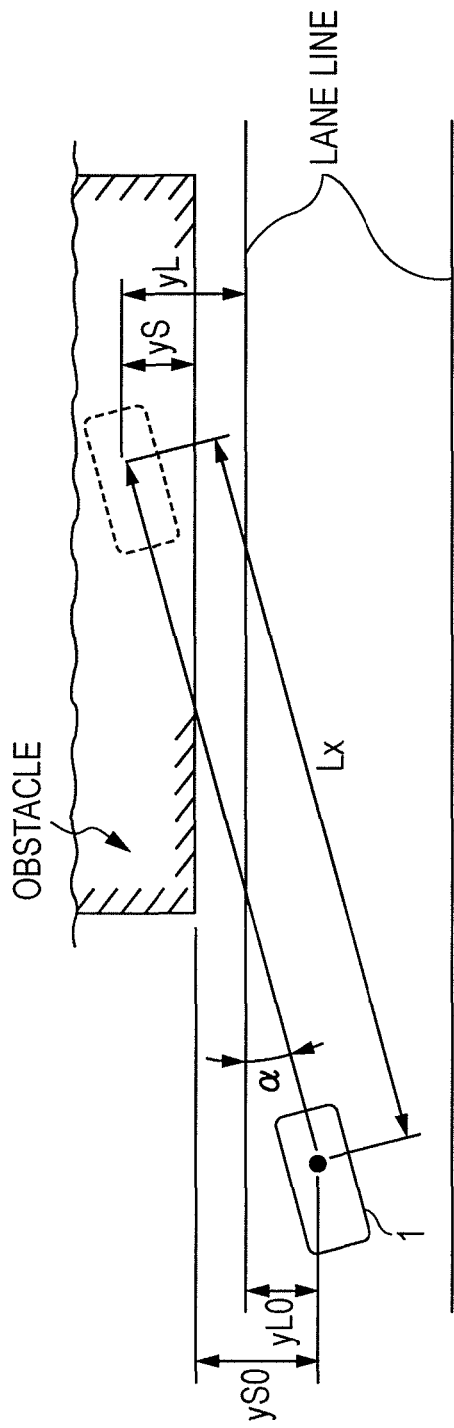
FIG. 8 is an explanatory diagram illustrating positional relationships of a subject vehicle with respect to a lane line and a roadside obstacle, and departure amounts respectively with respect to the lane line and the roadside obstacle according to the embodiment of the present invention.

As shown in FIG. 8, the image recognition device 4 calculates a crossing angle α that is an angle at which the current traveling direction of the subject vehicle 1 (the straight-running direction centering the camera position) and the lane line intersect. The image recognition device 4 further calculates a current distance yL0 from the center of the subject vehicle 1 to the lane line (a distance in a direction perpendicular to the lane line) and a current distance ys0 from the center of the subject vehicle 1 to an obstacle (a distance in a direction parallel to the direction perpendicular to the lane line), and outputs the calculated distances to the control unit 5. As described above, the stereo camera 3 and image recognition device 4 are provided as the road information detecting means.

To the control unit 5, the coordinate position information of the lane line and roadside obstacle, crossing angle α, current distance yL0 from the center of the subject vehicle 1 to the lane line, and the current distance ys0 from the center of the subject vehicle 1 to the obstacle are input from the image recognition device 4. Further, the vehicle speed V0 is input from the vehicle speed sensor 6 and a steering wheel angle θH is input from the steering wheel angle sensor 7.

According to a later-described lane departure prevention control program, the control unit 5 calculates an amount of departure of the subject vehicle 1 from the lane line after a predetermined time as a first departure amount yL based on the lane line position information and calculates an amount of departure of the subject vehicle 1 with respect to the obstacle after a predetermined time as a second departure amount yS based on the obstacle position information. The control unit 5 further sets braking forces (wheel braking forces Bfi, Bfo, Bri and Bro for lane departure prevention control) based on the departure amounts yL and yS with respect to the lane line and obstacle, and outputs the braking forces to the brake control unit 10, the braking forces for generating a yaw moment and a deceleration to the vehicle 1 and preventing the departure of the vehicle with respect to the lane line and obstacle. The control unit 5 also sets a departure level K for target pump motor rotation speed setting based on the vehicle speed V0, a difference of the steering wheel angle θH from the crossing angle α and the first departure amount yL, sets the target rotation speed Rp for the pump motor of the hydraulic unit in the brake control unit 10 based on the departure level K for target pump motor rotation speed setting, and then outputs the target rotation speed Rp to the brake control unit 10 so as to variably control the rotation speed of the pump motor.

Figure 2:
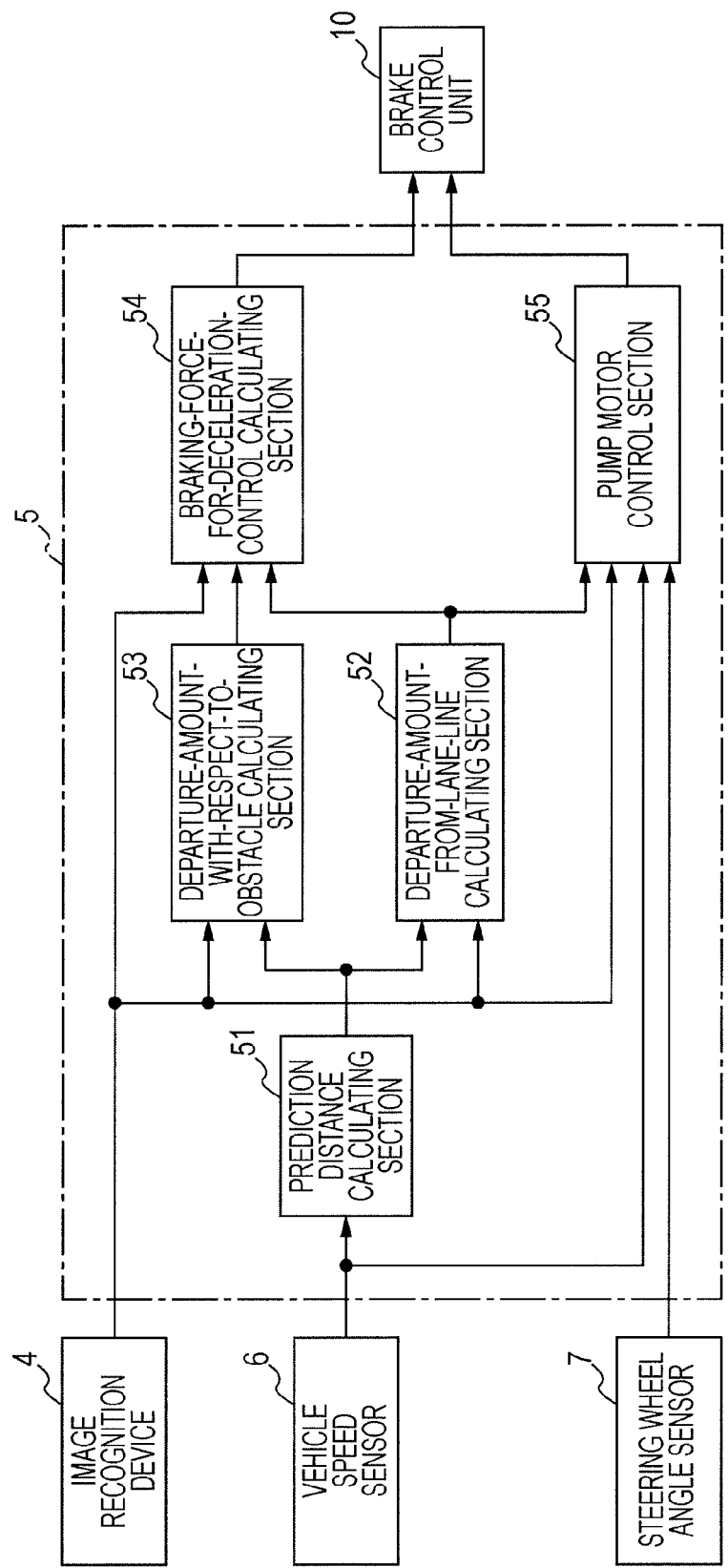
FIG. 2 is a functional block diagram of a control unit according to the embodiment of the present invention.

Thus, as shown in FIG. 2, the control unit 5 mainly includes a prediction distance calculator 51, a departure-amount-from-lane-line calculator 52, a departure-amount-with-respect-to-obstacle calculator 53, a braking-force-for-deceleration-control calculator 54 for deceleration control, and a pump motor controller 55.

To the prediction distance calculator 51, the vehicle speed V0 is input from the vehicle speed sensor 6, and the prediction distance calculator 51 calculates a prediction distance Lx using, for example, the following equation (1), and outputs the resultant prediction distance Lx to the departure-amount-from-lane-line calculator 52 and departure-amount-with-respect-to-obstacle calculator 53.

$$Lx = V0 \cdot t \quad (1)$$

Here, t is a predetermined predicted time. Thus, the prediction distance is a distance to a position where the subject vehicle 1 is assumed to be located after a predicted time t. Note that the prediction distance Lx is not limited to the distance calculated with the above equation (1).

To the departure-amount-from-lane-line calculator 52, the crossing angle α and the current distance yL0 from the center of the subject vehicle to the lane line are input from the image recognition device 4, and a prediction distance Lx is input from the prediction distance calculator 51. Then, as shown in FIG. 8, using the following equation (2), the departure amount (first departure amount) yL of the subject vehicle 1 from the lane line within the prediction distance Lx is calculated and output to the braking-force-for-deceleration-control calculator 54 and the pump motor controller 55.

$$yL = Lx \cdot \sin(\alpha) - yL0 \qquad (2)$$

As described above, the departure-amount-from-lane-line calculator 52 is provided as the departure amount calculating means.

To the departure-amount-with-respect-to-obstacle calculator 53, the crossing angle α and the current distance ys0 from the center of the subject vehicle to the obstacle are input from the image recognition device 4, and the prediction distance Lx is input from the prediction distance calculator 51. Then, as shown in FIG. 8, using the following equation (3), the departure-amount-with-respect-to-obstacle calculator 53 calculates the departure amount (the second departure amount) yS of the subject vehicle 1 with respect to the obstacle within the prediction distance Lx, and outputs the departure amount yS of the subject vehicle 1 with respect to the obstacle within the prediction distance Lx to the braking-force-for-deceleration-control calculator 54.

$$yS = Lx \cdot \sin(\alpha) - ys0 \qquad (3)$$

As described above, the departure-amount-with-respect-to-obstacle calculator 53 is provided as the departure amount calculating means.

The braking-force-for-deceleration-control calculator 54 is provided as the braking force control means. To the braking-force-for-deceleration-control calculator 54, the crossing angle α is input from the image recognition device 4, the vehicle speed V0 is input from the vehicle speed sensor 6, the first departure amount yL is input from the departure-amount-from-lane-line calculator 52, and the second departure amount yS is input from the departure-amount-with-respect-to-obstacle calculator 53.

Then, according to a later-described braking force calculation routine for deceleration control, the braking-force-for-deceleration-control calculator 54 sets a first braking force control amount ByL based on the first departure amount yL, the braking force control amount for generating a yaw moment to prevent the subject vehicle 1 from departing from the lane line, and a second braking force control amount ByS based on the second departure amount yS, the braking force control amount for generating a yaw moment to prevent the subject vehicle 1 from departing with respect to the obstacle. The braking-force-for-deceleration-control calculator 54 also sets a third braking force control amount BDL based on the first departure amount yL, the braking force control amount for generating a deceleration to prevent the subject vehicle 1 from departing from the lane line, and a fourth braking force control amount BDS based on the second departure amount yS, the braking force control amount for generating a deceleration to prevent the subject vehicle 1 from departing with respect to the obstacle. When braking force control is executed for generating a yaw moment to the subject vehicle 1 with the first and second braking force control amounts ByL and ByS, the braking-force-for-deceleration-control calculator 54 limits a share rate of the braking force control amount for the front-axle wheels to generate a yaw moment such that a steering torque in the lane line departure direction produced due to a location of a kingpin of the front suspension does not exceed a predetermined threshold (maximum braking force difference ΔBf_max between front-axle left and right wheels), and adjusts a braking force allocation such that the front-rear braking force allocation of either of the left wheel side or the right wheel side which is higher than that of the other side is equal to a predetermined braking force allocation (for example, ground contact load allocation). Then the braking-force-for-deceleration-control calculator 54 calculates wheel braking forces Bfi, Bfo, Bri and Bro, and outputs the resultant wheel braking forces Bfi, Bfo, Bri and Bro to the brake control unit 10 to perform lane departure prevention control.

Figure 3:
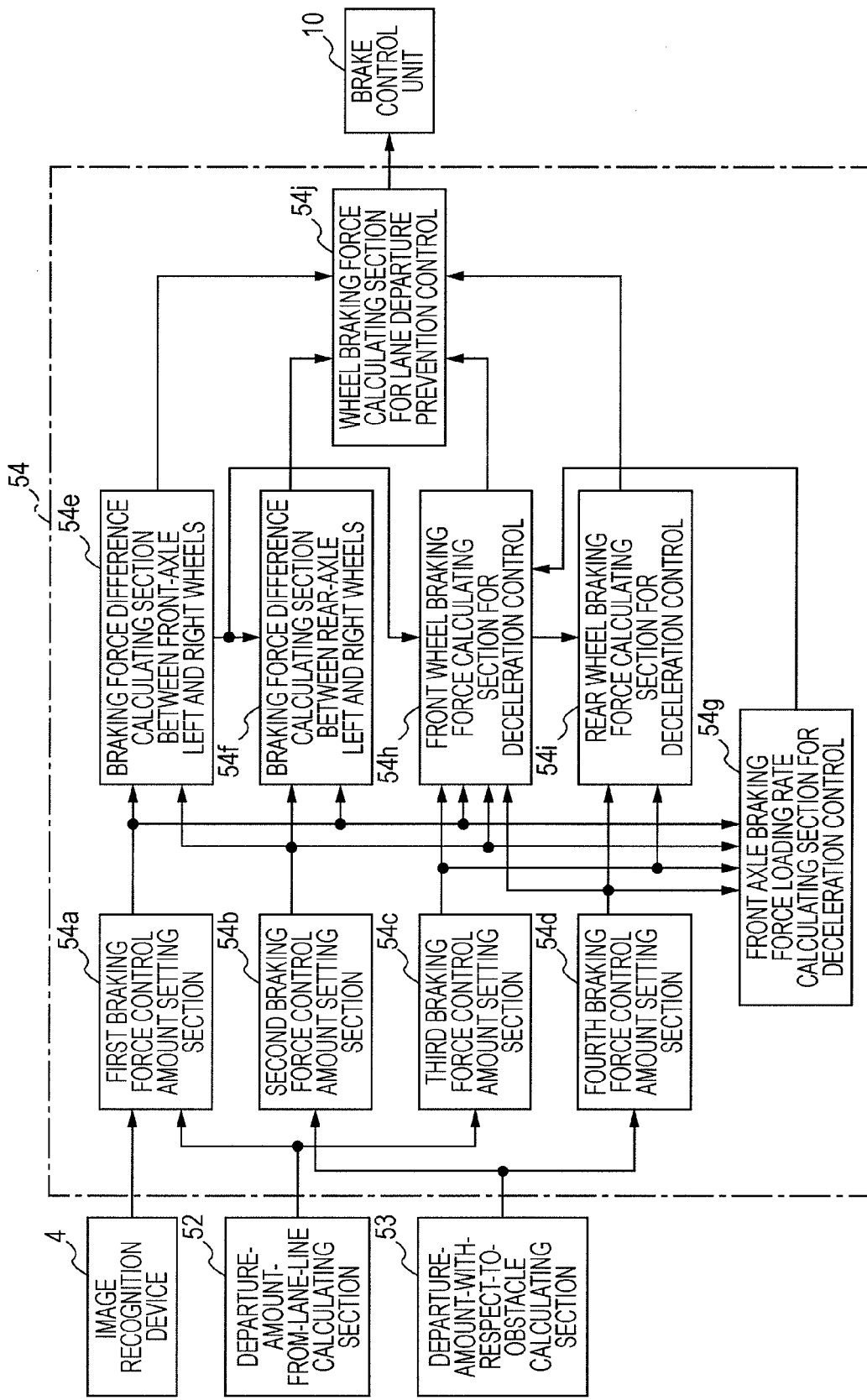
FIG. 3 is a functional block diagram of a braking force calculator for deceleration control according to the embodiment of the present invention.

Thus, as shown in FIG. 3, the braking-force-for-deceleration-control calculator 54 mainly includes a first braking force control amount setting section 54a, a second braking force control amount setting section 54b, a third braking force control amount setting section 54c, a fourth braking force control amount setting section 54d, a braking force difference calculating section 54e between front-axle left and right wheels, a braking force difference calculating section 54f between rear-axle left and right wheels, a front axle braking force loading rate calculating section 54g for deceleration control, a front wheel braking force calculating section 54h for deceleration control, a rear wheel braking force calculating section 54i for deceleration control and a wheel braking force calculating section 54j for lane departure prevention control.

Figure 9A:
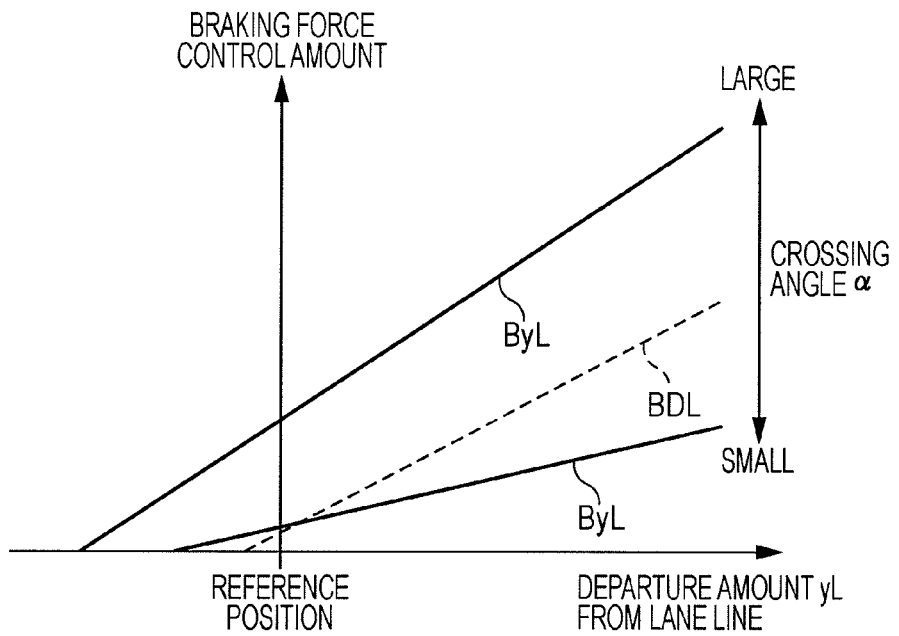
FIG. 9 is an explanatory diagram illustrating first and second braking force control amounts for generating a yaw moment, and third and fourth braking force control amounts for generating a deceleration according to the embodiment of the present invention.

To the first braking force control amount setting section 54a, the crossing angle α is input from the image recognition device 4 and the departure amount yL from the lane line is input from the departure-amount-from-lane-line calculator 52. Then the first braking force control amount setting section 54a sets the first braking force control amount ByL, referring to a map of the departure amount yL from the lane line, the crossing angle α and the first braking force control amount ByL, as shown in FIG. 9A, the map being set in advance based on an experiment, calculation or the like. Then the first braking force control amount setting section 54a outputs the resultant first braking force control amount ByL to the braking force difference calculating section 54e between front-axle left and right wheels, the braking force difference calculating section 54f between rear-axle left and right wheels, the front axle braking force loading rate calculating section 54g for deceleration control and the front wheel braking force calculating section 54h for deceleration control. Note that a reference position in FIG. 9A is a position set in advance. Examples of the reference position include a position that is distant from the lane line toward the center of the road by a predetermined distance and an end of the inner side (road center side) of the lane line. In addition, the first braking force control amount ByL is set based on the map shown in FIG. 9A, but is not limited to this and may be calculated with a predetermined calculation equation or the like.

As indicated in FIG. 9A, the first braking force control amount ByL is set larger as the crossing angle α is larger, in other words, the travel direction of the subject vehicle becomes orthogonal to the lane line and a degree of urgency is determined higher. Further, the first braking force control amount ByL is set larger as the departure amount yL from the lane line is larger.

A dashed line in FIG. 9A denotes the third braking force control amount BDL, which is to be described later. The first braking force control amount ByL is set such that the departure amount yL from the lane line is set within a smaller departure amount range than a departure amount range within which the third braking force control amount BDL is set.

Accordingly, if the departure amount yL of the subject vehicle 1 from a lane line changes from small to large, and then small again, firstly braking force control for preventing the subject vehicle 1 from departing from the lane line is performed which generates a yaw moment to the subject vehicle 1 using the first braking control amount ByL, while the departure amount yL is small.

Then when the departure amount yL from the lane line becomes large, in addition to the departure prevention control by yaw moment generation performed using the first braking force control amount ByL, braking force control for preventing the departure from the lane line is performed by generating a deceleration using the third braking control amount BDL.

Then when the departure amount yL from the lane line becomes small again, braking force control for preventing the departure from the lane line is performed by generating a yaw moment using only the first braking force control amount ByL.

Figure 9B:
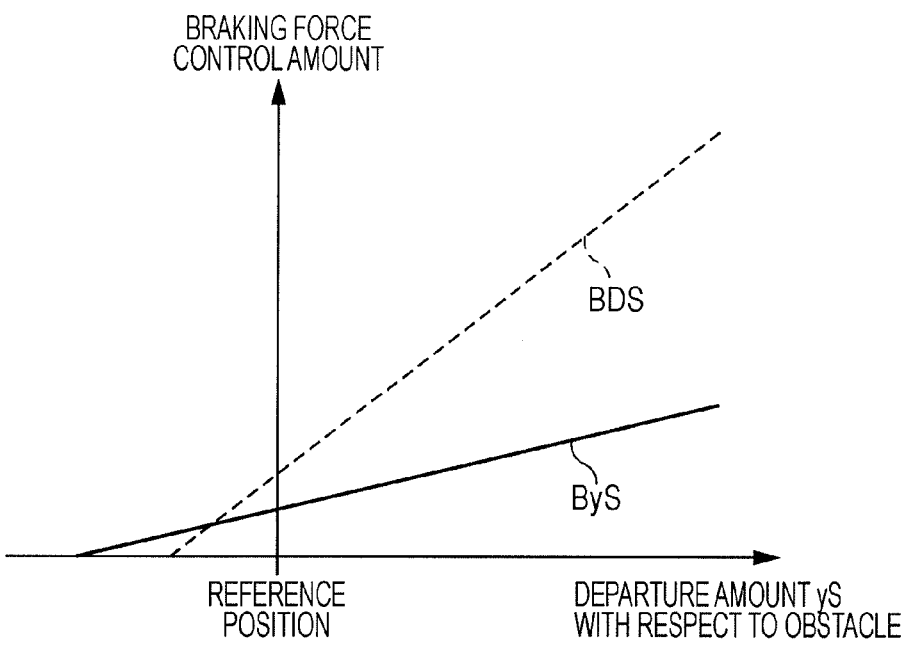

To the second braking force control amount setting section 54b, the departure amount yS of the subject vehicle with respect to the obstacle is input from the departure-amount-with-respect-to-obstacle calculator 53. Then the second braking force control amount setting section 54b sets the second braking force control amount ByS, referring to a map of the departure amount yS with respect to the obstacle and the second braking force control amount ByS, as shown in FIG. 9B, the map being set in advance based on an experiment, calculation or the like. Then the second force control amount setting section 54b outputs the resultant second braking force control amount ByS to the braking force difference calculating section 54e between front-axle left and right wheels, the braking force difference calculating section 54f between rear-axle left and right wheels, the front axle braking force loading rate calculating section 54g for deceleration control and the front wheel braking force calculating section 54h for deceleration control. Note that a reference position in FIG. 9B is a position set in advance. An Example of the reference position is a position that is distant from the lane line toward the center of the road by a predetermined distance. In addition, the second braking force control amount ByS is set based on the map shown in FIG. 9B, but is not limited to this, and may be calculated with a predetermined calculation equation or the like.

As indicated in FIG. 9B, the second braking force control amount ByS is set larger as the departure amount yS with respect to an obstacle is larger.

A dashed line in FIG. 9B denotes the fourth braking force control amount BDS, which is to be described later. The second braking force control amount ByS is set such that the departure amount yS with respect to an obstacle is set within a smaller departure amount range than a departure amount range within which the fourth braking force control amount BDS is set.

Accordingly, if the departure amount yS of the subject vehicle 1 with respect to an obstacle changes from small to large, and then small again, firstly braking force control for preventing the subject vehicle 1 from departing with respect to the obstacle is performed which generates a yaw moment to the subject vehicle 1 using the second braking control amount ByS, while the departure amount yS is small.

Then when the departure amount yS with respect to the obstacle becomes large, in addition to the departure prevention control by yaw moment generation performed using the second braking force control amount ByS, braking force control for preventing the departure with respect to the obstacle is performed by generating a deceleration using the fourth braking control amount BDS.

Then when the departure amount yS with respect to the obstacle becomes small again, braking force control for preventing the departure with respect to the obstacle is performed by generating a yaw moment using only the second braking force control amount ByS.

To the third braking force control amount setting section 54c, the departure amount yL from the lane line is input from the departure-amount-from-lane-line calculator 52. Then the third braking force control amount setting section 54c sets the third braking force control amount BDL, referring to a map of the departure amount yL from the lane line and the third braking force control amount BDL as shown in FIG. 9A, the map being set in advance based on an experiment, calculation or the like. Then the third braking force control amount setting section 54c outputs the resultant third braking force control amount BDL to the front axle braking force loading rate calculating section 54g for deceleration control, the front wheel braking force calculating section 54h for deceleration control and the rear wheel braking force calculating section 54i for deceleration control. Note that the third braking force control amount BDL is set based on the map shown in FIG. 9A, but is not limited to this, and may be calculated with a predetermined calculation equation or the like.

As indicated in FIG. 9A, the third braking force control amount BDL is set larger as the departure amount yL from the lane line is larger. Further, as described above, the first braking force control amount ByL is set within a smaller departure amount range than a departure amount range within which the third braking force control amount BDL is set.

To the fourth braking force control amount setting section 54d, the departure amount yS of the subject vehicle 1 with respect to the obstacle is input from the departure-amount-with-respect-to-obstacle calculator 53. Then the fourth braking force control amount setting section 54d sets the fourth braking force control amount BDS, referring to a map of the departure amount yS with respect to the obstacle and the fourth braking force control amount BDS, as shown in FIG. 9B, the map being set in advance based on an experiment, calculation or the like. Then the fourth force control amount setting section 54d outputs the resultant fourth braking force control amount BDS to the front axle braking force loading rate calculating section 54g for deceleration control, the front wheel braking force calculating section 54h for deceleration control and the rear wheel braking force calculating section 54i for deceleration control. Note that the fourth braking force control amount BDS is set based on the map shown in FIG. 9B, but is not limited to this, and may be calculated with a predetermined calculation equation or the like.

As indicated in FIG. 9B, the fourth braking force control amount BDS is set larger as the departure amount yS with respect to the obstacle is larger. Further, as described above, the second braking force control amount ByS is set within a smaller departure amount range than a departure amount range within which the fourth braking force control amount BDS is set.

Figure 10:
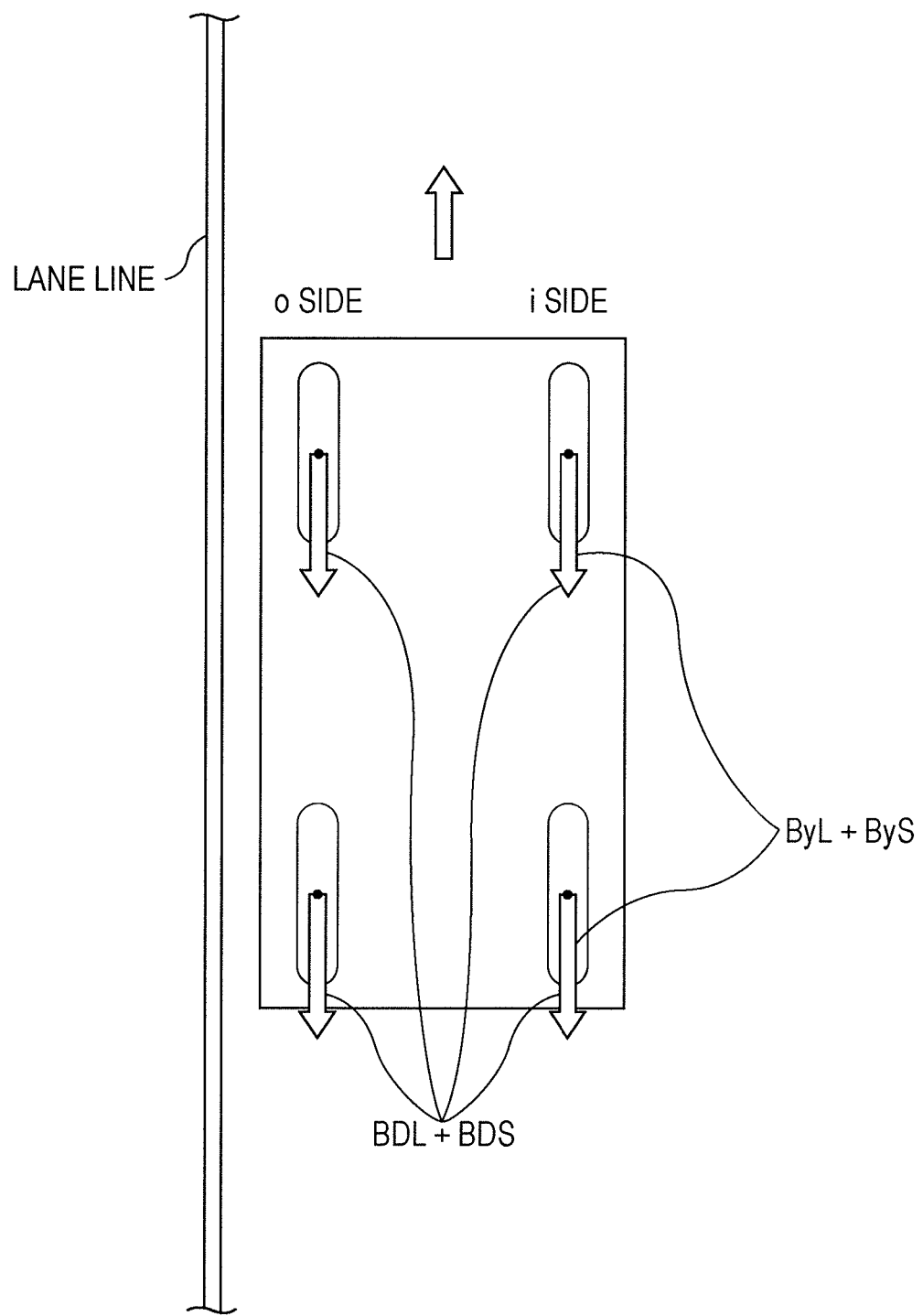
FIG. 10 is an explanatory diagram illustrating braking forces applied to wheels according to the embodiment of the present invention.

As described above, in this embodiment, the braking force control amount for generating a yaw moment to prevent the subject vehicle from departing from the lane line or with respect to the obstacle is "the first braking force control amount ByL+the second braking force control amount ByS," and, as shown in FIG. 10, is applied to wheels (front and rear wheels) at the road-center side (i side). Further, the braking force control amount for generating a deceleration to prevent the subject vehicle from departing from the lane line or with respect to the obstacle is "the third braking force control amount BDL+the fourth braking force control amount BDS," and, as shown in FIG. 10, is applied to all wheels.

To the braking force difference calculating section 54e between front-axle left and right wheels, the first braking force control amount ByL is input from the first braking force control amount setting section 54a, and the second braking force control amount ByS is input from the second braking force control amount setting section 54b. Then using the following equation (4), the braking force difference calculating section 54e between front-axle left and right wheels calculates a share rate of the braking force control amount for the front-axle side to generate a yaw moment to the subject vehicle, i.e., a braking force difference ΔBf between front-axle left and right wheels. Then the braking force difference calculating section 54e between front-axle left and right wheels outputs the resultant braking force difference ΔBf between front-axle left and right wheels to the braking force difference calculating section 54f between rear-axle left and right wheels, the front wheel braking force calculating section 54h for deceleration control and the wheel braking force calculating section 54j for lane departure prevention control.

$$\Delta Bf = \min((ByL+ByS) \cdot Cy, \Delta Bf\_max) \quad (4)$$

Here, min in the equation (4) is a function selecting a smaller one from (ByL+ByS)·Cy and ΔBf_max.

Cy is a yaw moment loading rate of the front axle, the rate being set in advance based on an experiment, calculation or the like. ΔBf_max is a maximum braking force difference between front-axle left and right wheels, and is calculated with the following equation (5).

$$\Delta Bf\_max = -(Tf\_str \cdot Gstr)/Lscr \quad (5)$$

Here, Tf_str is a friction torque in the steering system, Gstr is a steering gear ratio, and Lscr is a scrub radius (a positive scrub is expressed with the plus sign (+), and a negative scrub is expressed with the minus sign (−)). Accordingly, the maximum braking force difference ΔBf_max between front-axle left and right wheels is a conversion of the friction in the steering system, scrub radius and the like to a braking force difference between front-axle left and right wheels. According to the equation (4), the braking force difference ΔBf between front-axle left and right wheels is constantly limited to be equal to or less than the maximum braking force difference ΔBf_max between front-axle left and right wheels. Specifically, when braking force control is executed for generating a yaw moment to the subject vehicle 1 with the first and second braking force control amounts ByL and ByS, a share rate of the braking force control amount for the front-axle wheels to generate a yaw moment is limited such that a steering torque in the lane line departure direction produced due to the location of a kingpin of the front suspension does not exceed a predetermined threshold (maximum braking force difference ΔBf_max between front-axle left and right wheels).

To the braking force difference calculating section 54f between rear-axle left and right wheels, the first braking force control amount ByL is input from the first braking force control amount setting section 54a, and the second braking force control amount ByS is input from the second braking force control amount setting section 54b. Then using the following equation (6), the braking force difference calculating section 54f between rear-axle left and right wheels calculates a braking force control amount for the rear-axle side upon the execution of braking force control for generating a yaw moment to the subject vehicle, i.e., a braking force difference ΔBr between rear-axle left and right wheels. Then the braking force difference calculating section 54f between rear-axle left and right wheels outputs the resultant braking force difference ΔBr between rear-axle left and right wheels to the wheel braking force calculating section 54j for lane departure prevention control.

$$\Delta Br = (ByL+ByS) - \Delta Bf \quad (6)$$

To the front axle braking force loading rate calculating section 54g for deceleration control, the first braking force control amount ByL is input from the first braking force control amount setting section 54a, the second braking force control amount ByS is input from the second braking force control amount setting section 54b, the third braking force control amount BDL is input from the third braking force control amount setting section 54c, and the fourth braking force control amount BDS is input from the fourth braking force control amount setting section 54d. Then using the following equation (7), the front axle braking force loading rate calculating section 54g for deceleration control calculates a front axle braking force loading rate CD for deceleration control. Then the front axle braking force loading rate calculating section 54g for deceleration control outputs the resultant front axle braking force loading rate CD for deceleration control to the front wheel braking force calculating section 54h for deceleration control.

$$CD = (Wf - ((BDL+BDS)+(ByL+ByS)) \cdot (Hg/Lwb))/(m \cdot g) \quad (7)$$

Here, Wf is a front-axle load when acceleration or deceleration is not performed, m is a vehicle mass, Hg is a center of gravity height, Lwb is a wheelbase and g is a gravitational acceleration. Accordingly, the front axle braking force loading rate CD for deceleration control is a ground contact load allocation for the front axle side that factors in a dynamic load shift.

To the front wheel braking force calculating section 54h for deceleration control, the first braking force control amount ByL is input from the first braking force control amount setting section 54a, the second braking force control amount ByS is input from the second braking force control amount setting section 54b, the third braking force control amount BDL is input from the third braking force control amount setting section 54c, the fourth braking force control amount BDS is input from the fourth braking force control amount setting section 54d, the braking force difference ΔBf between front-axle left and right wheels is input from the braking force difference calculating section 54e between front-axle left and right wheels, and the front axle braking force loading rate CD for deceleration control is input from the front axle braking force loading rate calculating section 54g for deceleration control. Then using the following equation (8), the front wheel braking force calculating section 54h for deceleration control calculates a front wheel braking force Bf for deceleration control. Then the front wheel braking force calculating section 54h for deceleration control outputs the resultant front axle braking force Bf for deceleration control to the rear wheel braking force calculating section 54i for deceleration control and the wheel braking force calculating section 54j for lane departure prevention control.

$$Bf = (BDL+BDS)/2 + (ByL+ByS)) \cdot CD - \Delta Bf \quad (8)$$

Accordingly, the equation (8) obtains the front wheel braking force Bf for deceleration control, using the front axle braking force loading rate CD for deceleration control and making adjustment, thereby achieving an ideal braking force allocation that factors in a dynamic load shift.

To the rear wheel braking force calculating section 54i for deceleration control, the third braking force control amount BDL is input from the third braking force control amount setting section 54c, the third braking force control amount BDL is input from the third braking force control amount setting section 54c, the fourth braking force control amount BDS is input from the fourth braking force control amount setting section 54d, and the front wheel braking force Bf for deceleration control is input from the front wheel braking force calculating section 54h for deceleration control. Then using the following equation (9), the rear wheel braking force calculating section 54i for deceleration control calculates a rear wheel braking force Br for deceleration control. Then the rear wheel braking force calculating section 54i for deceleration control outputs the resultant rear wheel braking force Br for deceleration control to the wheel braking force calculating section 54j for lane departure prevention control.

$$Br=(BDL+BDS)/2-Bf \quad (9)$$

To the wheel braking force calculating section 54j for lane departure prevention control, the braking force difference $\Delta Bf$ between front-axle left and right wheels is input from the braking force difference calculating section 54e between front-axle left and right wheels, the braking force difference $\Delta Br$ between rear-axle left and right wheels is input from the braking force difference calculating section 54f between rear-axle left and right wheels, the front wheel braking force Bf for deceleration control is input from the front wheel braking force calculating section 54h for deceleration control, and the rear wheel braking force Br for deceleration control is input from the rear wheel braking force calculating section 54i for deceleration control. Then using the following equations (10) to (13), the wheel braking force calculating section 54j for lane departure prevention control calculates the deceleration braking force Bfi for the road-center-side front wheel, the deceleration braking force Bfo for the roadside-side front wheel, the deceleration braking force Bri for the road-center-side rear wheel and the deceleration braking force Bro for the roadside-side rear wheel. Then the wheel braking force calculating section 54j for lane departure prevention control outputs the resultant wheel braking forces Bfi, Bfo, Bri and Bro for lane departure prevention control to generate braking forces corresponding to the wheel braking forces Bfi, Bfo, Bri and Bro for lane departure prevention control to respective wheels.

$$Bfi=\Delta Bf+Bf \quad (10)$$

$$Bfo=Bf \quad (11)$$

$$Bri=\Delta Br+Br \quad (12)$$

$$Bro=Bf \quad (13)$$

As described above, in the present embodiment, braking force control amounts to generate a yaw moment for preventing lane departure are applied to the road-center-side front and rear wheels of the subject vehicle 1, and therefore lane departure is reliably prevented. Further, a share rate of these braking force control amounts for the front-axle wheels to generate a yaw moment is limited with a consideration of a steering friction, a scrub radius, and the like and a complement between the front and rear wheels such that a steering torque in the lane line departure direction produced due to the location of a kingpin of the front suspension is prevented from being generated. As a result, even in the case that a driver loses hold of the steering wheel, the rotation of the steering wheel in the lane line direction is reliably prevented. In addition, this embodiment can be applied to any type of front suspension easily and highly accurately. Furthermore, the front wheel braking force Bf for lane departure prevention control and the rear wheel braking force Br for lane departure prevention control are adjusted with a consideration of a dynamic load shift and thus an ideal braking force allocation is always achieved.

Now as shown in FIG. 2, the pump motor controller 55 is provided as the pump motor rotation speed control means. To the pump motor controller 55, the crossing angle $\alpha$ is input from the image recognition device 4, the vehicle speed V0 is input from the vehicle speed sensor 6, the steering wheel angle $\theta H$ is input from the steering wheel angle sensor 7, and the first departure amount yL from the lane line is input from the departure-amount-from-lane-line calculator 52.

Following a pump motor control routine to be described later, the pump motor controller 55 sets the departure level K for target pump motor rotation speed setting based on the vehicle speed V0, the difference of the steering wheel angle $\theta H$ from the crossing angle $\alpha$ and the first departure amount yL, sets the target rotation speed Rp for the pump motor of the hydraulic unit in the brake control unit 10 based on the departure level K for target pump motor rotation speed setting, and then outputs the target rotation speed Rp to the brake control unit 10 so as to variably control the rotation speed of the pump motor.

Figure 4:
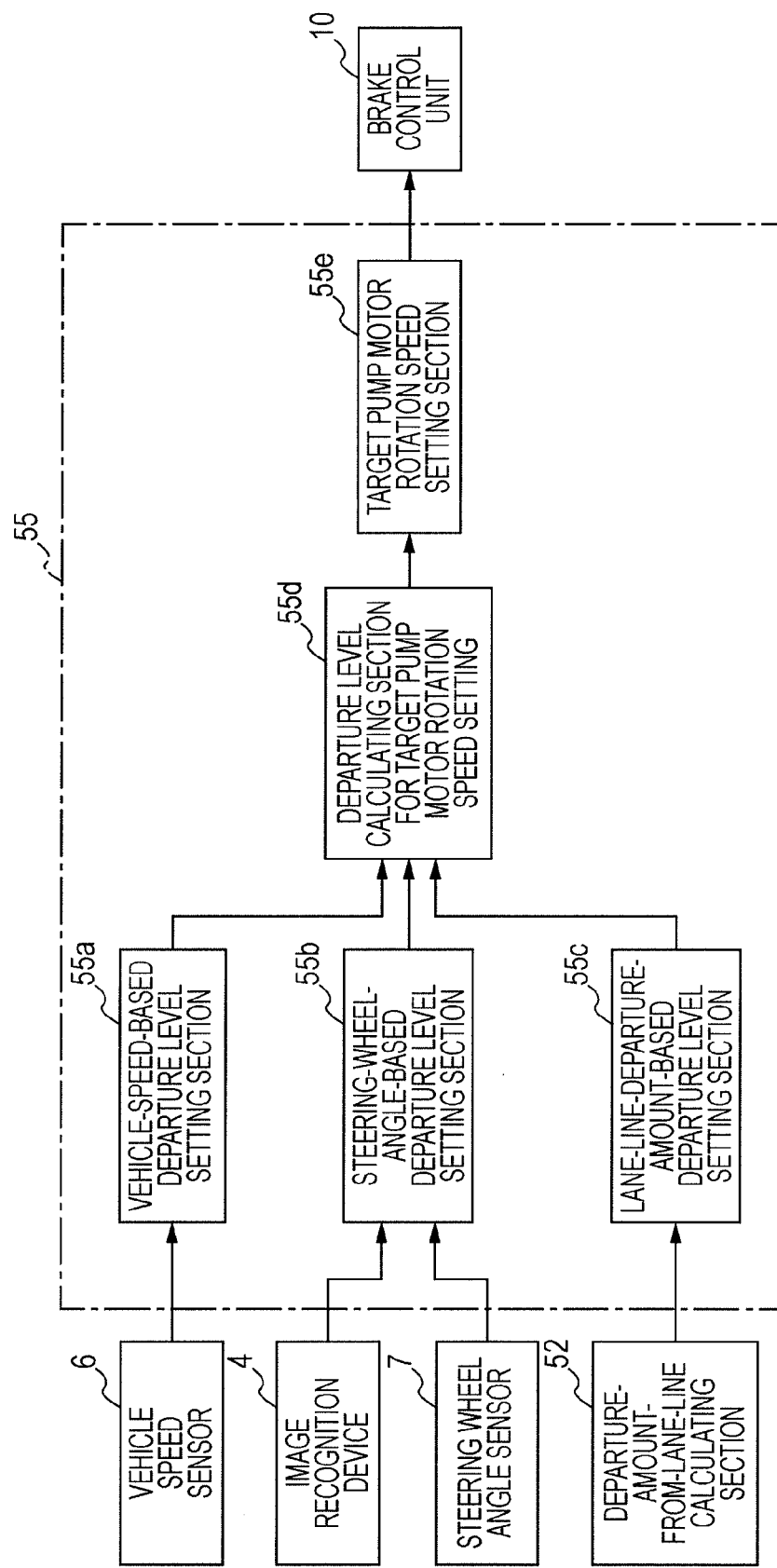
FIG. 4 is a functional block diagram of a pump motor controller according to the embodiment of the present invention.

Accordingly, as shown in FIG. 4, the pump motor controller 55 mainly includes a vehicle-speed-based departure level setting section 55a, a steering-wheel-angle-based departure level setting section 55b, a lane-line-departure-amount-based departure level setting section 55c, a departure level calculating section 55d for target pump motor rotation speed setting, and a target pump motor rotation speed setting section 55e.

Figure 11:
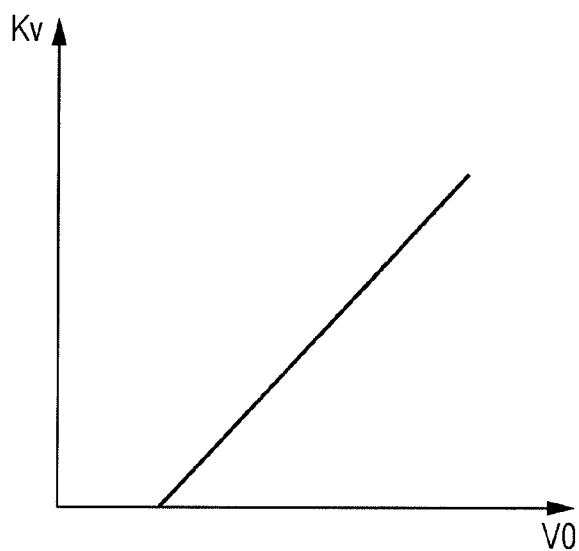
FIG. 11 is an explanatory diagram illustrating a characteristic of a departure level based on a vehicle speed according to the embodiment of the present invention.

To the vehicle-speed-based departure level setting section 55a, the vehicle speed V0 is input from the vehicle speed sensor 6. Then, the vehicle-speed-based departure level setting section 55a sets a departure level Kv corresponding to the vehicle speed, referring to a map as shown in FIG. 11 for example, the map being set in advance based on experiments, calculations or the like. Then, the vehicle-speed-based departure level setting section 55a outputs the resultant departure level Kv corresponding to the vehicle speed to the departure level calculating section 55d for target pump motor rotation speed setting. As indicated in FIG. 11, when the vehicle speed V0 is higher, possibility of lane departure is determined to be higher, and the departure level Kv corresponding to the vehicle speed is set larger.

Figure 12:
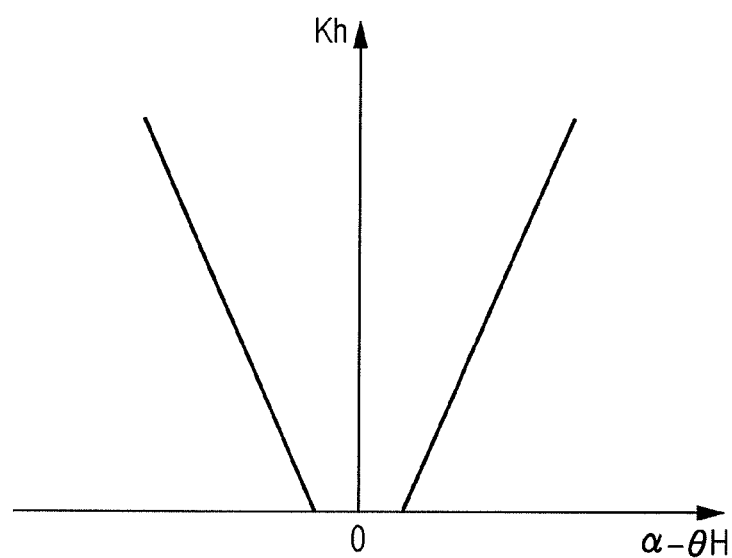
FIG. 12 is an explanatory diagram illustrating a characteristic of a departure level based on a steering wheel angle according to the embodiment of the present invention.

To the steering-wheel-angle-based departure level setting section 55b, the crossing angle $\alpha$ is input from the image recognition device 4, and the steering wheel angle $\theta H$ is input from the steering wheel angle sensor 7. Then, the steering-wheel-angle-based departure level setting section 55b sets a departure level Kh corresponding to a difference between the crossing angle and the steering wheel angle, referring to a map as shown in FIG. 12 for example. Then, the steering-wheel-angle-based departure level setting section 55b outputs the resultant departure level Kh corresponding to the steering wheel angle to the departure level calculating section 55d for target pump motor rotation speed setting. As indicated in FIG. 12, when the difference between the crossing angle $\alpha$ and the steering wheel angle $\theta H$ is higher, possibility of lane departure is determined to be higher, and the departure level Kh corresponding to the steering wheel angle is set larger.

Figure 13:
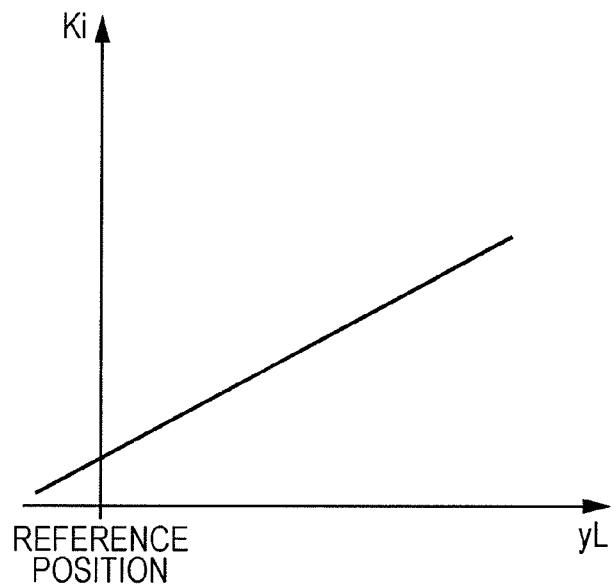
FIG. 13 is an explanatory diagram illustrating a characteristic of a departure level based on a departure amount from a lane line according to the embodiment of the present invention.

To the lane-line-departure-amount-based departure level setting section 55c, the first departure amount yL from the lane line is input from the departure-amount-from-lane-line calculator 52. Then, the lane-line-departure-amount-based departure level setting section 55c sets a departure level Ki corresponding to the departure amount from the lane line, referring to a map as shown in FIG. 13 for example. Then, the lane-line-departure-amount-based departure level setting section 55c outputs the resultant departure level Ki corresponding to the departure amount from the lane line to the departure level calculating section 55d for target pump motor rotation speed setting. As indicated in FIG. 13, when the first departure amount yL from the lane line is higher, possibility of lane departure is determined to be higher, and the departure level Ki corresponding to the departure amount from the lane line is set larger. Note that a reference position in FIG. 13 is a position set in advance. Examples of the reference position include a position that is distant from the lane line toward the center of the road by a predetermined distance and an end of the inner side (road center side) of the lane line.

To the departure level calculating section 55d for target pump motor rotation speed setting, the departure level Kv corresponding to the vehicle speed is input from the vehicle-speed-based departure level setting section 55a, the departure level Kh corresponding to the steering wheel angle is input from the steering-wheel-angle-based departure level setting section 55b, and the departure level Ki corresponding to the departure amount from the lane line is input from the lane-line-departure-amount-based departure level setting section 55c. Then using the following equation (14) for example, the departure level calculating section 55d for target pump motor rotation speed setting calculates the departure level K for target pump motor rotation speed setting, and outputs the resultant departure level K for target pump motor rotation speed setting to the target pump motor rotation speed setting section 55e.

$$K = \alpha \cdot Kv + \beta \cdot Kh + \gamma \cdot Ki \quad (14)$$

Here, $\alpha$, $\beta$ and $\gamma$ are constants that are set in advance based on experiments, calculations or the like. Note that the departure level K for target pump motor rotation speed setting may be set by an equation other than the above equation (14), a map, or the like.

Figure 14:
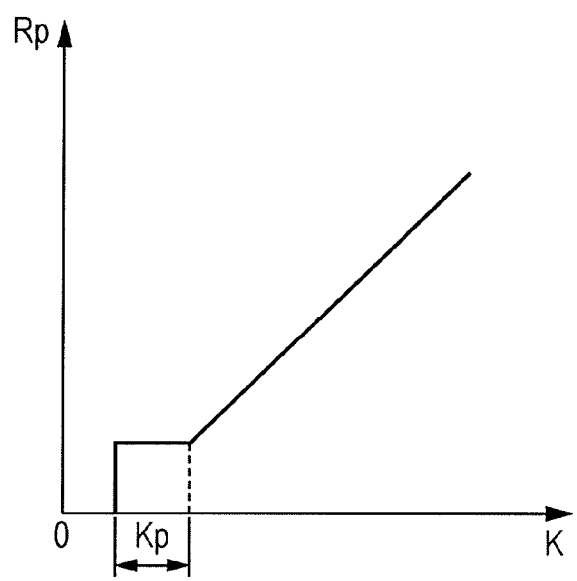
FIG. 14 is an explanatory diagram illustrating a characteristic of a target pump rotation speed set based on a departure level for target pump motor rotation speed setting according to the embodiment of the present invention.

To the target pump motor rotation speed setting section 55e, the departure level K for target pump motor rotation speed setting is input from the departure level calculating section 55d for target pump motor rotation speed setting. Then, the target pump motor rotation speed setting section 55e sets the target pump motor rotation speed Rp referring to a predetermined map as shown in FIG. 14, for example. Then, the target pump motor rotation speed setting section 55e outputs the resultant target pump motor rotation speed Rp to the brake control unit 10 to variably control the rotation speed of the pump motor. As indicated in FIG. 14, when the departure level K for target pump motor rotation speed setting is higher and thus possibility of lane departure is higher, the target pump motor rotation speed Rp is set to a higher rotation speed value so that sufficient braking force is exercised. Furthermore, in a region Kp in FIG. 14, the region where the departure level K for target pump motor rotation speed setting is low, there is expected to be possibility of lane departure even though the departure level K for target pump motor rotation speed setting is low. Therefore, in the region Kp, brake fluid is pre-compressed so that braking force is generated with a good response while the pump motor is kept at a low rotation speed.

Figure 5:
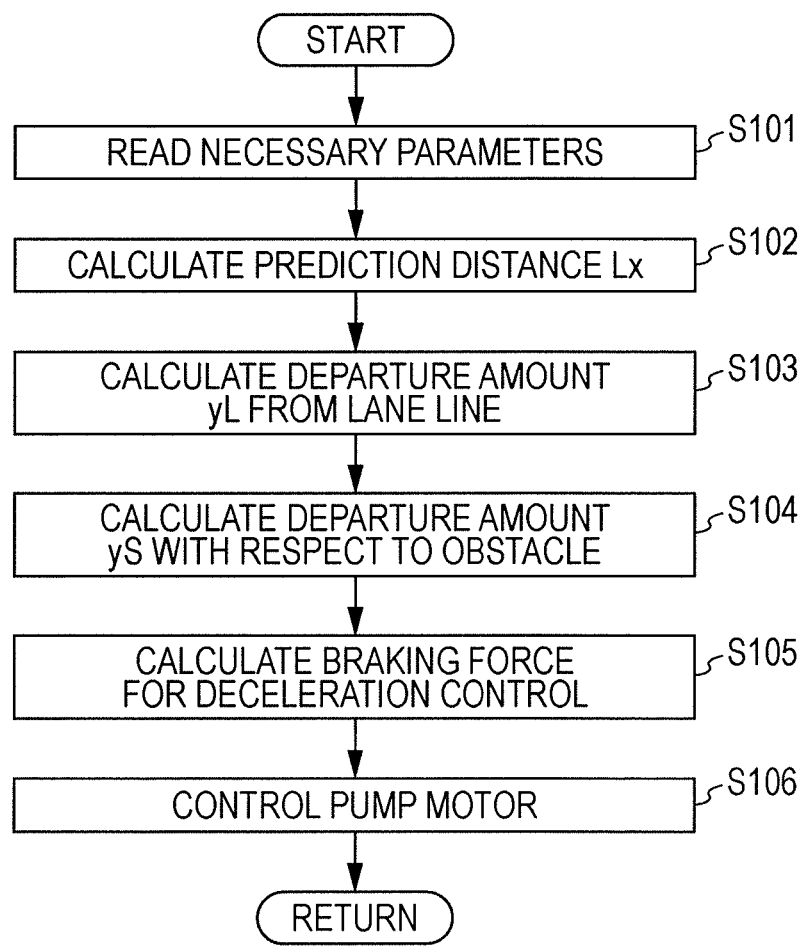
FIG. 5 is a flow chart of a lane departure prevention control program according to the embodiment of the present invention.

The lane departure prevention control program which is executed in the aforementioned vehicular lane departure prevention control apparatus 2 will be hereunder described using a flow chart shown in FIG. 5. Firstly, in step (hereunder abbreviated as S) 101, necessary parameters i.e., the coordinate position information of the lane line and roadside obstacle, the crossing angle $\alpha$, the current distance yL0 from the center of the subject vehicle to the lane line, the current distance ys0 from the center of the subject vehicle, the vehicle speed V0, and the steering wheel angle $\theta$H are read.

Next, the program proceeds to S102, where the prediction distance calculator 51 calculates the prediction distance Lx using the aforementioned equation (1).

Next, the program proceeds to S103, where the departure-amount-from-lane-line calculator 52 calculates the departure amount yL from the lane line using the aforementioned equation (2).

Next, the program proceeds to S104, where the departure-amount-with-respect-to-obstacle calculator 53 calculates the departure amount yS of the subject vehicle with respect to the obstacle using the aforementioned equation (3).

Next, the program proceeds to S105, where the braking-force-for-deceleration-control calculator 54 calculates the wheel braking forces Bfi, Bfo, Bri and Bro for lane departure prevention control according to a later-described braking force calculation routine for deceleration control shown in FIG. 6. Then the braking-force-for-deceleration-control calculator 54 outputs the resultant wheel braking forces to the brake control unit 10.

Next, the program proceeds to S106, where the pump motor controller 55 sets the target pump motor rotation speed Rp of the hydraulic unit in the brake control unit 10 according to a later-described pump motor control routine shown in FIG. 7. Then the pump motor controller 55 outputs the resultant target pump motor rotation speed Rp to the brake control unit 10 to variably control the rotation speed of the pump motor. Then the program ends.

Figure 6:
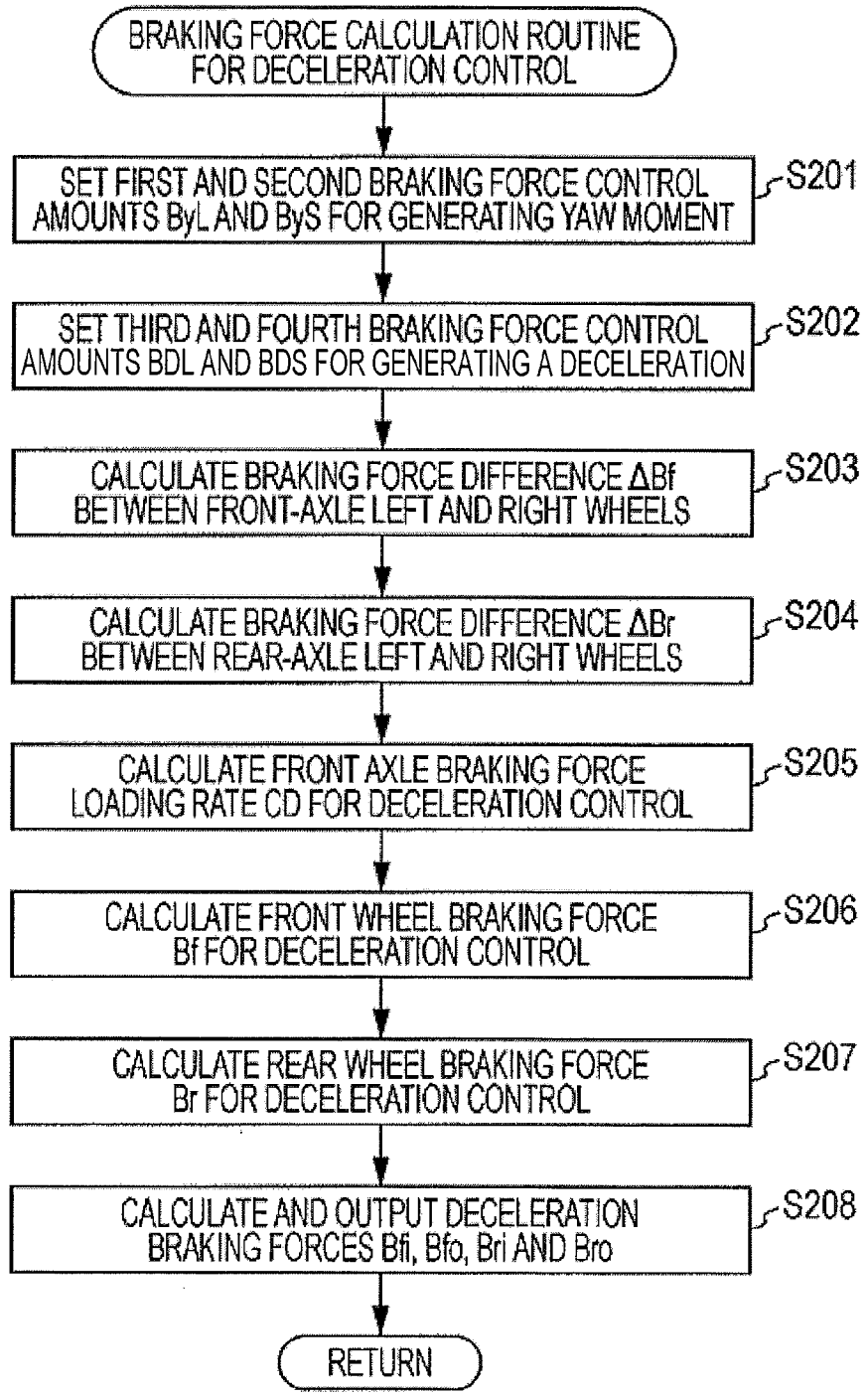
FIG. 6 is a flow chart of a braking force calculation routine for deceleration control according to the embodiment of the present invention.

FIG. 6 shows the flow chart of the braking force calculation routine for deceleration control which is executed in S105 of the aforementioned lane departure prevention control program.

Firstly, in S201, the first braking force control amount setting section 54a sets the first braking force control amount ByL for generating a yaw moment by referring to a map of the departure amount yL from the lane line, the crossing angle $\alpha$ and the first braking force control amount ByL, as shown in FIG. 9A for example. Further, the second braking force control amount setting section 54b sets the second braking force control amount ByS for generating a yaw moment by referring to a map of the departure amount yS with respect to the obstacle and the second braking force control amount ByS, as shown in FIG. 9B for example.

Next, the routine proceeds to S202, where the third braking force control amount setting section 54c sets the third braking force control amount BDL for generating a deceleration by referring to the map of the departure amount yL from the lane line and the third braking force control amount BDL as shown in FIG. 9A for example. Further, the fourth braking force control amount setting section 54d sets the fourth braking force control amount BDS for generating deceleration by referring to the map of the departure amount yS with respect to the obstacle and the fourth braking force control amount BDS, as shown in FIG. 9B for example.

Next, the routine proceeds to S203, where the braking force difference calculating section 54e between front-axle left and right wheels calculates the braking force difference $\Delta$Bf between front-axle left and right wheels, using the aforementioned equation (4).

Next, the routine proceeds to S204, where the braking force difference calculating section 54f between rear-axle left and right wheels calculates the braking force difference $\Delta$Br between rear-axle left and right wheels, using the aforementioned equation (6).

Next, the routine proceeds to S205, where the front axle braking force loading rate calculating section 54g for deceleration control calculates the front axle braking force loading rate CD for deceleration control, using the aforementioned equation (7).

Next, the routine proceeds to S206, where the front wheel braking force calculating section 54h for deceleration control calculates the front wheel braking force Bf for deceleration control, using the aforementioned equation (8).

Next, the routine proceeds to S207, where the rear wheel braking force calculating section 54*i* for deceleration control calculates the rear wheel braking force Br for deceleration control, using the aforementioned equation (9).

Next, the routine proceeds to S208, where the wheel braking force calculating section 54*j* for lane departure prevention control calculates the deceleration braking force Bfi for the road-center-side front wheel, the deceleration braking force Bfo for the roadside-side front wheel, the deceleration braking force Bri for the road-center-side rear wheel and the deceleration braking force fiBfell- Bro for the roadside-side rear wheel, using the aforementioned equations (10) to (13). Then the wheel braking force calculating section 54*j* for lane departure prevention control outputs the resultant braking forces to the brake control unit 10. Then the program ends.

As described above, the braking-force-for-deceleration-control calculator 54 according to the embodiment of the present invention calculates an amount of departure from a lane line as the first departure amount yL, calculates an amount of departure of with respect to an obstacle as the second departure amount yS, sets the first braking force control amount ByL for generating a yaw moment to prevent the subject vehicle 1 from departing from the lane line based on the first departure amount yL, and sets the second braking force control amount ByS for generating a yaw moment to prevent the subject vehicle 1 from departing with respect to the obstacle based on the second departure amount yS. Further, the braking-force-for-deceleration-control calculator 54 sets the third braking force control amount BDL for generating a deceleration to prevent the subject vehicle 1 from departing from the lane line based on the first departure amount yL, and sets the fourth braking force control amount BDS for generating a deceleration to the subject vehicle 1 to prevent the subject vehicle 1 from departing with respect to the obstacle based on the second departure amount yS. When braking force control is executed for generating a yaw moment to the subject vehicle 1 with the first and second braking force control amounts ByL and ByS, the braking-force-for-deceleration-control calculator 54 limits a share rate of the braking force control amount for the front-axle wheels to generate a yaw moment such that a steering torque in the lane line departure direction produced due to the location of a kingpin of the front suspension does not exceed a predetermined threshold (for example, maximum braking force difference ΔBf_max between front-axle left and right wheels), and adjusts a braking force allocation such that the front-rear braking force allocation of either of the left wheel side or the right wheel side which is higher than that of the other side is equal to a predetermined braking force allocation (for example, ground contact load allocation). Then the braking-force-for-deceleration-control calculator 54 calculates the wheel braking forces Bfi, Bfo, Bri and Bro, and outputs the resultant wheel braking forces Bfi, Bfo, Bri and Bro to the brake control unit 10 to perform lane departure prevention control.

As a result, braking force control amounts to generate a yaw moment for preventing lane departure are applied to the road-center-side front and rear wheels of the subject vehicle 1, and therefore lane departure is reliably prevented. Further, a share rate of these braking force control amounts for the front-axle wheels to generate a yaw moment is limited with a consideration of a steering friction, a scrub radius, and the like and a complement between the front and rear wheels such that a steering torque in the lane line departure direction produced due to the location of a kingpin of the front suspension is prevented from being generated. As a result, even in the case that a driver loses hold of the steering wheel, the rotation of the steering wheel in the lane departure direction is reliably prevented. In addition, this embodiment can be applied to any type of front suspension easily and highly accurately. Furthermore, the front wheel braking force Bf for deceleration control and the rear wheel braking force Br for deceleration control are adjusted with a consideration of a dynamic load shift and thus an ideal braking force allocation is always achieved.

Figure 7:
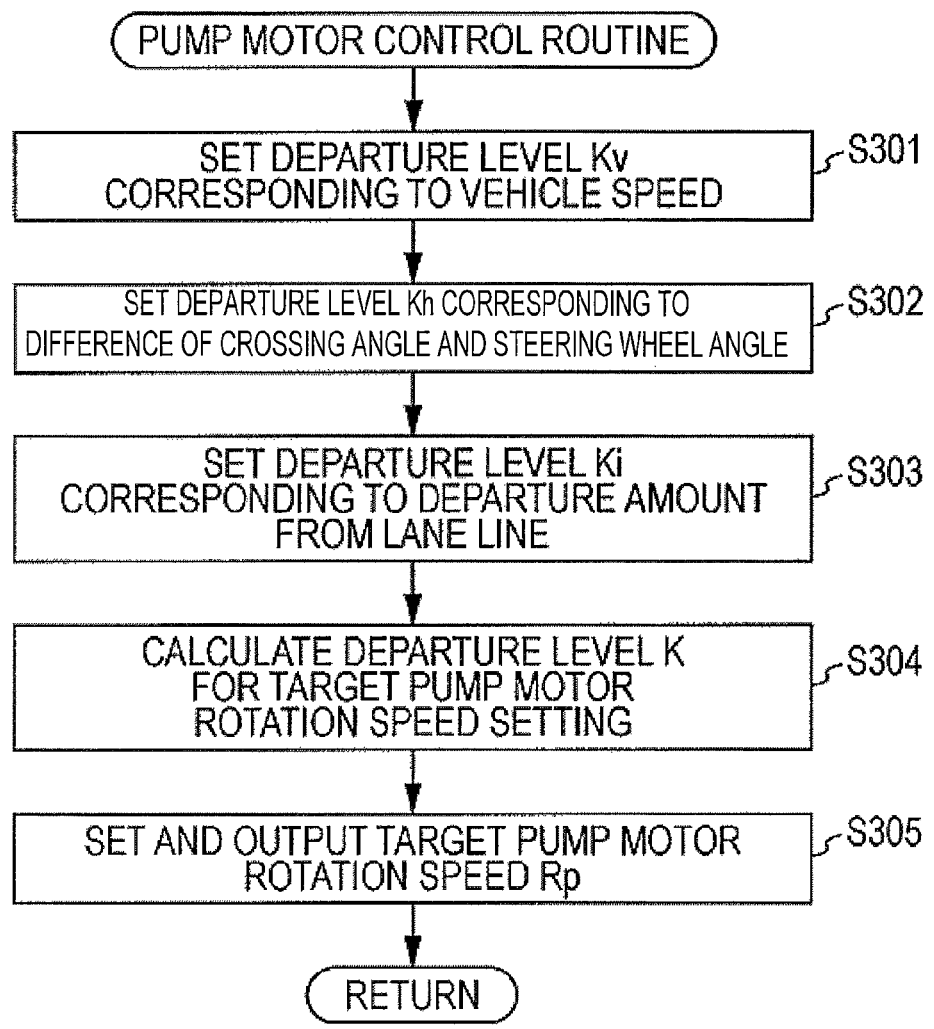
FIG. 7 is a flow chart of a pump motor control routine according to the embodiment of the present invention.

FIG. 7 shows a flow chart of the pump motor control routine which is executed in S106 of the aforementioned lane departure prevention control program. Firstly, in S301, the vehicle-speed-based departure level setting section 55*a* sets the departure level Kv corresponding to the vehicle speed, referring to a predetermined map as shown in FIG. 11, for example.

Next, the routine proceeds to S302, where the steering-wheel-angle-based departure level setting section 55*b* sets the departure level Kh corresponding to the steering wheel angle, referring to a predetermined map as shown in FIG. 12, for example.

Next, the routine proceeds to S303, where the lane-line-departure-amount-based departure level setting section 55*c* sets the departure level Ki corresponding to the departure amount from the lane line, referring to a predetermined map as shown in FIG. 13, for example.

Next, the routine proceeds to S304, where the departure level calculating section 55*d* for target pump motor rotation speed setting calculates the departure level K for target pump motor rotation speed setting, using the aforementioned equation (14), for example.

Next, the routine proceeds to S305, where the target pump motor rotation speed setting section 55*e* sets the target pump motor rotation speed Rp referring to a predetermined map, for example, as shown in FIG. 14, and outputs the resultant target pump motor rotation speed Rp to the brake control unit 10 to variably control the rotation speed of the pump motor. Then the routine ends.

As described above, the pump motor controller 55 according to the present embodiment sets the departure level K for target pump motor rotation speed setting based on the vehicle speed V0, the difference of the steering wheel angle θH from the crossing angle α and the first departure amount yL, sets the target rotation speed Rp for the pump motor of the hydraulic unit in the brake control unit 10 based on the departure level K for target pump motor rotation speed setting, and then outputs the target rotation speed Rp to the brake control unit 10 so as to variably control the rotation speed of the pump motor. Therefore, any lane departure amount can be accepted and the operation of a pump motor can be minimized, thereby suppressing the generation of operation noise and vibration and extending the life of the pump motor. In particular, the target rotation speed Rp is set not by the first departure amount yL only, but departure level K for target pump motor rotation speed setting is used for setting the target rotation speed Rp, the departure level which factors in the vehicle speed V0 and the difference of the steering wheel angle θH from the crossing angle α, in addition to the first departure amount yL. Accordingly, even when the first departure amount yL is small, but the departure level K for target pump motor rotation speed setting comprehensively becomes high, and, as a result, possibility of lane departure is expected, the pump motor is operated with precompression, and thus any lane departure amount can be accepted with a good response.

On a road where a lane line is not detected, a virtual lane line may be set based on geographical information of a navigation system or the like or based on position information of a detected roadside obstacle, and control may be performed based on the virtual lane line. Furthermore, if a roadside obstacle is not detected, control may be performed based on a predetermined value (for example, a large value).

The target rotation speed Rp for the pump motor of the hydraulic unit in the brake control unit 10 may be set with a consideration of the second departure amount yS which is the departure amount with respect to an obstacle. For example, a departure level corresponding to the departure amount with respect to an obstacle may be set with a map or the like, and the departure level K for target pump motor rotation speed setting may be calculated such that the departure level corresponding to the departure amount with respect to an obstacle is included (further added), and the target rotation speed Rp may be set based on the resultant departure level K for target pump motor rotation speed setting.

What is claimed is:

1. A vehicular lane departure prevention control apparatus comprising:
    road information detecting means for detecting at least roadside obstacle information and lane line information;
    departure amount calculating means for calculating a departure amount with respect to a roadside obstacle and a departure amount with respect to a lane line based on the roadside obstacle information and the lane line information;
    braking force control means for controlling braking means by calculating a braking force for generating a yaw moment and a deceleration to a subject vehicle so as to prevent the departure of the subject vehicle with respect to the roadside obstacle based on the departure amount with respect to the roadside obstacle and the departure of the subject vehicle with respect to the lane line based on the departure amount with respect to the lane line; and
    pump motor rotation speed control means for calculating a resultant departure level, for target pump motor rotation speed control, as a function of a plurality of individual departure levels including an individual departure level based on the departure amount with respect to a roadside obstacle, and an individual departure level based on the departure amount with respect to a lane line; for setting a target rotation speed of a pump motor of the braking means based on the resultant departure level; and for variably controlling the rotation speed of the pump motor based on the resultant departure level.

2. A vehicular lane departure prevention control apparatus comprising:
    road information detecting means for detecting at least roadside obstacle information and lane line information;
    departure amount calculating means for calculating a departure amount with respect to an obstacle and a departure amount with respect to a lane line based on the roadside obstacle information and the lane line information;
    braking force control means for controlling braking means by calculating a braking force for generating a yaw moment and a deceleration to a subject vehicle so as to prevent the departure of the subject vehicle with respect to the obstacle based on the departure amount with respect to the obstacle and the departure of the subject vehicle with respect to the lane line based on the departure amount with respect to the lane line; and
    pump motor rotation speed control means for setting a target rotation speed of a pump motor of the braking means based on at least the departure amounts and variably controlling the rotation speed of the pump motor, wherein
    the pump motor rotation speed control means sets a departure level for target pump motor rotation speed setting based on the subject vehicle speed, a difference of a steering wheel angle from an angle at which a current traveling direction of the subject vehicle and a lane line intersect, and the departure amounts; and sets a target rotation speed for the pump motor based on the departure level for target pump motor rotation speed setting.

3. A vehicular lane departure prevention control apparatus comprising:
    a road information detecting unit configured to detect at least lane line information;
    a departure amount calculating unit configured to calculate a departure amount with respect to a lane line based on the lane line information;
    a braking force control unit configured to control a braking unit and to calculate a braking force to generate a yaw moment and a deceleration to a subject vehicle so as to prevent the departure of the subject vehicle with respect to the lane line based on the departure amount with respect to the lane line; and
    a pump motor rotation speed control unit configured to variably control the rotation speed of a pump motor of the braking unit, wherein
    the pump motor rotation speed control unit is configured to calculate a resultant departure level, for target pump motor rotation speed control, as a function of a plurality of individual departure levels, and
    the pump motor rotation speed control unit is configured to variably control a target rotation speed for the pump motor based on the resultant departure level for target pump motor rotation speed control.

4. The vehicular lane departure prevention control apparatus according to claim 3, wherein
    the pump motor rotation speed control unit is configured to calculate the resultant departure level, for target pump motor rotation speed control, as a function of at least the following individual departure levels (i)-(iii):
    (i) a departure level based on the subject vehicle speed;
    (ii) a departure level based on a difference of a steering wheel angle from an angle at which a current traveling direction of the subject vehicle and a lane line intersect; and
    (iii) a departure level based on the departure amount with respect to a lane line.

5. The vehicular lane departure prevention control apparatus according to claim 4, wherein
    the road information detecting unit is configured to detect roadside obstacle information;
    the departure amount calculating unit is configured to calculate a departure amount with respect to a roadside obstacle based on the roadside obstacle information;
    the braking force control unit is configured to calculate a braking force and control the braking unit to generate a yaw moment and a deceleration to the subject vehicle so as to prevent the departure of the subject vehicle with respect to the roadside obstacle based on the departure amount with respect to the roadside obstacle; and
    the pump motor rotation speed control unit is configured to calculate the resultant departure level, for target pump motor rotation speed control, as a function including the further individual departure level (iv):
    (iv) a departure level based on the departure amount with respect to a roadside obstacle.

6. The vehicular lane departure prevention control apparatus according to claim 1, wherein
the pump motor rotation speed control means calculates the resultant departure level, for target pump motor rotation speed control, as the output of a function that includes further variables for: the subject vehicle speed; and a difference of a steering wheel angle from an angle at which a current traveling direction of the subject vehicle and a lane line intersect, and
the pump motor rotation speed control means sets a target rotation speed for the pump motor based on the resultant departure level for target pump motor rotation speed control.

7. The vehicular lane departure prevention control apparatus according to claim 6, wherein, at least when the calculated resultant departure level is below a preset threshold, the pump motor rotation speed control means controls the pump motor to precompress a brake fluid.

8. The vehicular lane departure prevention control apparatus according to claim 3, wherein the pump motor rotation speed control unit is configured to control the pump motor to precompress a brake fluid, at least when the calculated resultant departure level is below a preset threshold.

9. The vehicular lane departure prevention control apparatus according to claim 1, wherein, when both the departure amount of the subject vehicle with respect to the lane line and the departure amount of the subject vehicle with respect to the roadside obstacle are below respective threshold values, the braking force control means controls the braking means to output a braking force for generating only a yaw moment.

10. The vehicular lane departure prevention control apparatus according to claim 9, wherein, when one of the departure amount of the subject vehicle with respect to the lane line and the departure amount of the subject vehicle with respect to the roadside obstacle is above a respective threshold value, the braking force control means controls the braking means to output a braking force for generating both a yaw moment and a deceleration.

11. The vehicular lane departure prevention control apparatus according to claim 5, wherein the braking force control unit is configured to control the braking unit to output a braking force for generating only a yaw moment when both the departure amount of the subject vehicle with respect to the lane line and the departure amount of the subject vehicle with respect to the roadside obstacle are below respective threshold values.

12. The vehicular lane departure prevention control apparatus according to claim 11, wherein the braking force control unit is configured to control the braking unit to output a braking force for generating both a yaw moment and a deceleration when one of the departure amount of the subject vehicle with respect to the lane line and the departure amount of the subject vehicle with respect to the roadside obstacle is above a respective threshold value.

\* \* \* \* \*